United States Patent
Seo et al.

(10) Patent No.: US 8,060,322 B2
(45) Date of Patent: Nov. 15, 2011

(54) BATTERY MANAGEMENT SYSTEM AND DRIVING METHOD THEREOF

(75) Inventors: Se-Wook Seo, Yongin-si (KR); Soo-Seok Choi, Yongin-si (KR); Young-Jo Lee, Yongin-si (KR); Yong-Jun Tae, Yongin-si (KR); Han-Seok Yun, Yongin-si (KR); Gye-Jong Lim, Yongin-si (KR); Beom-Gyu Kim, Yongin-si (KR); Ho-Young Park, Yongin-si (KR); Kyu-Nam Han, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 91 days.

(21) Appl. No.: 11/829,219

(22) Filed: Jul. 27, 2007

(65) Prior Publication Data

US 2008/0077339 A1 Mar. 27, 2008

(30) Foreign Application Priority Data

Sep. 26, 2006 (KR) .................. 10-2006-0093591

(51) Int. Cl.
*G01R 31/36* (2006.01)

(52) U.S. Cl. ........................................................ 702/63
(58) Field of Classification Search .................. 702/57, 702/63–65, 79, 176, 182, 183; 324/429, 324/433
See application file for complete search history.

(56) References Cited

U.S. PATENT DOCUMENTS

| 2002/0113595 A1* | 8/2002 | Sakai et al. ................... 324/433 |
| 2004/0008031 A1* | 1/2004 | Arai et al. ..................... 324/429 |
| 2005/0073315 A1* | 4/2005 | Murakami et al. ............ 324/433 |

FOREIGN PATENT DOCUMENTS

| JP | 7-98367 | 4/1995 |
| JP | 2001-272444 | 10/2001 |
| KR | 1997-2337 | 1/1997 |
| KR | 2006-10965 | 2/2006 |

* cited by examiner

*Primary Examiner* — Mohamed Charioui
(74) *Attorney, Agent, or Firm* — Christie, Parker & Hale, LLP

(57) ABSTRACT

Battery management system and a driving method thereof including a sensing unit and an MCU. The sensing unit measures a battery current and a battery voltage. The MCU sets an OCV during a no-load state period at time increments measured from the beginning of the no-load state period, and estimates an SOC corresponding to the set OCV.

17 Claims, 4 Drawing Sheets

BATTERY MANAGEMENT SYSTEM AND DRIVING METHOD THEREOF

CROSS-REFERENCE TO RELATED APPLICATIONS

This application claims the benefit of Korean Patent Application No. 2006-93591, filed Sep. 26, 2006, in the Korean Intellectual Property Office, the disclosure of which is incorporated herein by reference.

BACKGROUND OF THE INVENTION

1. Field of the Invention

Aspects of the present invention relate to a battery management system. More particularly, aspects of the present invention relate to a battery management system used in a vehicle using electrical energy.

2. Description of the Related Art

Vehicles with an internal combustion engine using gasoline or diesel have caused serious air pollution. Accordingly, various attempts to develop electric or hybrid vehicles have recently been made to reduce such air pollution.

An electric vehicle uses an electric motor operating by electrical energy output from a battery. As the electric vehicle generally uses a battery formed of at least one battery pack including a plurality of rechargeable/dischargeable (or secondary) cells, there is merit in that the electric vehicle generates no emission gases and produces less noise.

The term "hybrid vehicle" commonly refers to a gasoline-electric hybrid vehicle that uses gasoline to power an internal-combustion engine and a battery to power an electric motor. Recently, hybrid vehicles using an internal-combustion engine and fuel cells and hybrid vehicles using a battery and fuel cells have been developed. The fuel cells directly produce electrical energy through a chemical reaction between hydrogen and oxygen, which are continuously provided thereto.

Since battery performance directly affects the performance of the vehicle using electrical energy, it is required that each battery cell has great performance. Also, a battery management system (BMS) is necessary to measure a voltage and a current of the overall battery to efficiently manage charging/discharging operations of each battery cell therein.

In general, the battery management system uses a data table, in which a relationship between an open circuit voltage (OCV) and a state of charge (SOC) is stored, to estimate the SOC therefrom. In this case, it is required to precisely measure the OCV so as to precisely calculate the SOC.

When the battery is in the no-load state after being consistently charged or discharged, the OCV may not be precisely measured since polarization and internal resistance in the battery is generated. A length of time necessary to correct the polarization is required to precisely measure the OCV. However, it is difficult to guarantee such a time when a hybrid vehicle is driven. Accordingly, an error in measuring the OCV measured in a short time or before the correction of the polarization may cause an error in the calculation of the SOC.

The above information disclosed in this Background section is only for enhancement of understanding of the background of the invention and therefore it may contain information that does not form the prior art that is already known in this country to a person of ordinary skill in the art.

SUMMARY OF THE INVENTION

Aspects of the present invention have been made in an effort to provide a battery management system having advantages of estimating a more precise state of charge (SOC) by more precisely measuring an open circuit voltage (OCV), and a driving method thereof.

A battery management system according to one embodiment of the present invention includes a sensing unit and a main control unit (MCU). The sensing unit measures a battery current and a battery voltage. The MCU resets an open circuit voltage (OCV) according to a no-load state period from a first point, and estimates a state of charge (SOC) that corresponds to the reset OCV. The first point may correspond to a time at which a vehicle is stopped or charging/discharging of a battery is stopped. The MCU may set the battery voltage to the OCV with an increment of a determining period during the no-load state period. The determining period may be time-varying. The MCU may include a timer, an OCV setting unit, and an SOC estimating unit. The timer measures a no-load state period from the first point. The OCV setting unit sets the battery voltage to the OCV setting with the determining period increment during the no-load state period. The OSC estimating unit receives the OCV and estimates the SOC by using the received OCV.

A driving method according to another embodiment of the present invention is provided to a battery management system. The driving method includes measuring a no-load state period from a first point, setting a battery voltage to an OCV with an increment of a determining period during the no-load state period, and estimating an SOC by using the OCV. The first point may correspond to a time at which a vehicle is stopped or charging/discharging of a battery is stopped. In addition, the determining period may be time-varying.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
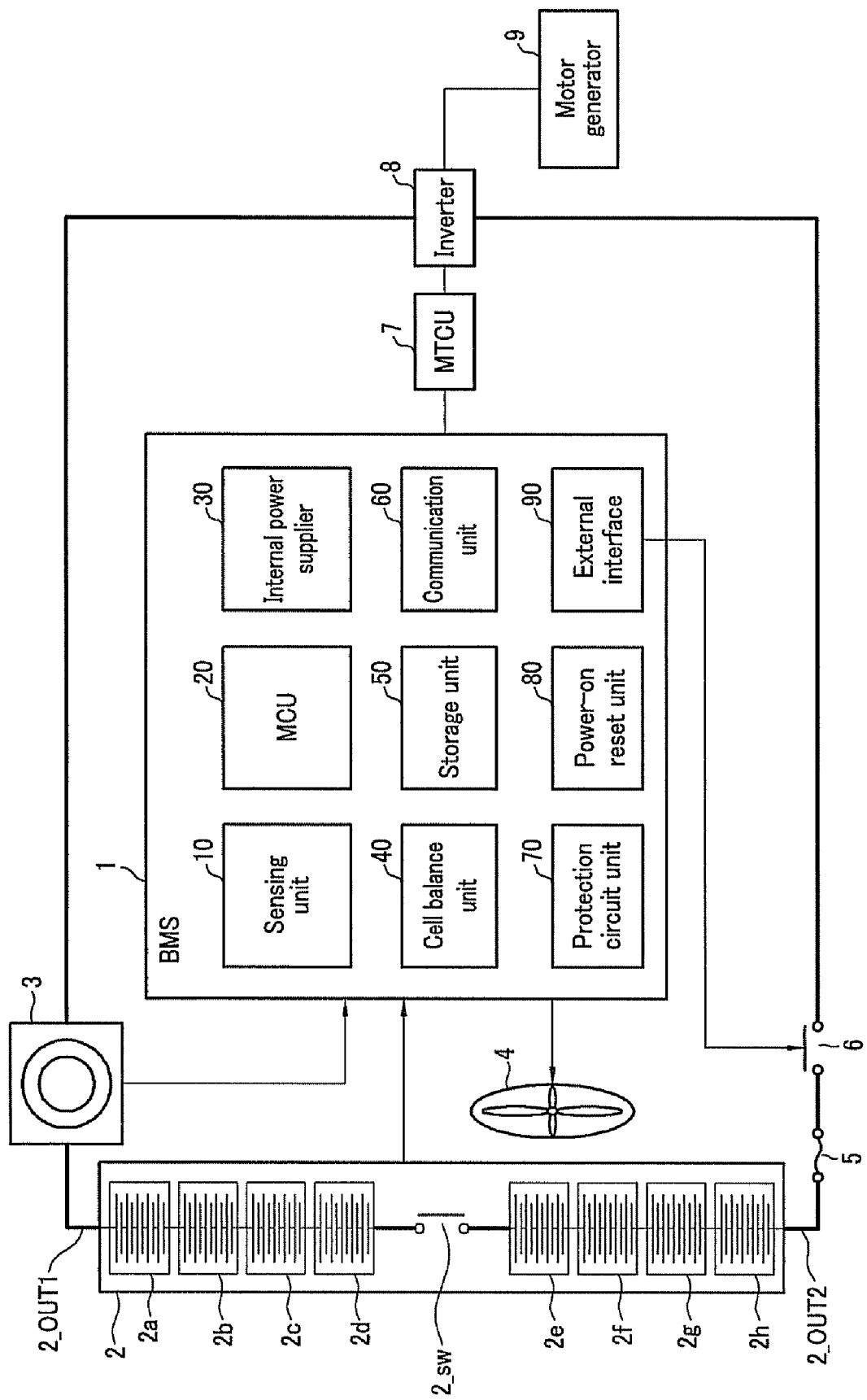
FIG. 1 shows a diagram of a battery, a battery management system (BMS), and peripheral devices of the BMS according to aspects of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 shows a diagram of a battery, a battery management system (BMS), and peripheral devices of the BMS according to an embodiment of the present invention. As shown in FIG. 1, the hybrid electric vehicle system includes a battery management system (BMS) 1, a battery 2, a current sensor 3, a cooling fan 4, a fuse 5, a main switch 6, a motor control unit (MTCU) 7, an inverter 8, and a motor generator 9.

The battery 2 includes a plurality of sub-packs 2a to 2h having a plurality of battery cells coupled in series, a first output terminal 2_OUT1, a second output terminal 2_OUT2, and a safety switch 2_SW. The safety switch 2 SW is disposed between the sub-pack 2d and the sub-pack 2e. As such, the battery cells are electrically coupled in series, but may be coupled via another device, such as the safety switch 2_SW. While 8 sub-packs 2a to 2h are exemplified and each sub-pack is a group of a plurality of battery cells in this embodiment of the present invention, it is not limited thereto. The battery 2 may include more or fewer sub-packs and battery cells, both of which may be arranged in series or parallel. The safety switch 2_SW is manually turned on/off to guarantee the safety of a user when performing operations on the battery or replacing the battery. The safety switch 2_SW is provided between the sub-pack 2d and the sub-pack 2e but is not limited thereto. The first output terminal 2_OUT1 and the second output terminal 2_OUT2 are coupled to the inverter 8 via the current sensor 3 and the fuse 5 and the main switch 6, respectively.

The current sensor 3 measures an output current of the battery 2 and outputs the measured output current to a sensing unit 10 of the BMS 1. In more detail, the current sensor 3 may be provided as a hall current transformer (Hall CT) that uses the Hall effect via a hall element to measure a current and output an analog current signal corresponding to the measured current value. The current sensor 3 may also be an ammeter disposed in a load line or a shunt resistor, which outputs a voltage signal corresponding to a current value through a resistor inserted in the load line.

The cooling fan 4 cools heat generated by charging and discharging the battery 2 in response to a control signal from the BMS 1. The cooling fan 4 prevents the battery 2 and the charging/discharging efficiency thereof from deteriorating due to temperature increases.

The fuse 5 prevents an overflowing current, which may be caused by a short circuit of the battery 2, from being transmitted to the battery 2. That is, when an over-current is generated, the fuse 5 is disconnects or breaks the circuit so as to interrupt the current from overflowing and damaging the battery 2.

The main switch 6 turns the battery 2 on and off in response to the control signals of the BMS 1 or control signals of the MTCU 7. The main switch 6 further protects the battery 2 from unusual phenomenon, such as an overflowing voltage, an overflowing current, and high temperatures.

The BMS 1 includes a sensing unit 10, a main control unit (MCU) 20, an internal power supplier 30, a cell balance unit 40, a storage unit 50, a communication unit 60, a protection circuit unit 70, a power-on reset unit 80, and an external interface 90.

The sensing unit 10 measures a battery voltage and a battery current and transmits the measured values to the MCU 20. Hereinafter, the term "battery current" refers to a charging/discharging current of the battery 2. In addition, the term "battery voltage" refers to a voltage at an output terminal of the battery 2.

The MCU 20 determines a state of charge (SOC) of the battery 2 based on the battery voltage transmitted from the sensing unit 10, and generates information that indicates the SOC of the battery 2. Then, the MCU 20 transmits the information to the MTCU 7 of the vehicle. The MCU 20 measures a length of time of a no-load state from a first or stop point. Further, when the length of time of the no-load state equals a length of time of a determining period, the MCU 20 receives the OCV of the battery 2 from the sensing unit 10, sets the OCV of the battery 2 as an OCV setting, and determines the SOC from the OCV setting. Herein, the first or stop point corresponds to a point at which the vehicle is stopped or the battery 2 is not charging or discharging and varies with time. In more detail, the determining period may correspond to a value that increases with a constant time increment or increases with an inconstant (or random) time increment meaning that after the length of time equal to the determining period, the length of time of the determining period is redefined with reference to the first point and increased by a constant or inconstant time increment. Or expressed another way, the OCV of the battery 2 is measured and the SOC of the battery 2 is determined at regular or irregular increments of time during a no-load period. So, a first determining of the SOC will occur after a first length of time set for the determining period and may be 10 minutes after the stop point, and a second determining of the SOC will occur after a second length of time set for the determining period and may be 20 minutes after the stop point. However, the lengths of time of the no-load period and the determining period need not be equal. Instead, the setting of the OCV setting accomplished according to the lengths of time of the no-load period and the determining period. This will be described in more detail with reference to FIG. 2 to FIG. 4.

The MCU 20 estimates an SOC corresponding to the OCV. When the vehicle is stopped for at least a time as long as the determining period, an OCV setting is reset as measured at the end of the determining period, and an SOC is re-estimated therefrom. When the vehicle is stopped for at least a time longer than the determining period and longer than the second length of time set for the determining period, the OCV setting is reset as measured at the end of the determining period (after the second length of time), and an SOC is re-estimated therefrom.

The internal power supplier 30 supplies power to the BMS 1 by using a backup battery (not shown). The cell balance unit 40 balances an SOC of each cell in the battery 2. That is, cells that are relatively more charged are discharged, and cells that are relatively less charged are charged. The storage unit 50 stores data of the current SOC and a current state of health (SOH) when the power source of the BMS 1 is turned off.

The communication unit 60 communicates with the MTCU 7 of the vehicle. The protection unit 70 uses firmware elements to protect the battery 2 from shocks, overflowed currents, and low voltages. The power-on reset unit 80 resets the overall system when the power source of the BMS 1 is turned on. The external interface 90 couples auxiliary devices for the BMS 1, such as the cooling fan 4 and the main switch 6, to the MCU 20. While the cooling fan 4 and the main switch 6 are shown as the auxiliary devices of the BMS 1, it is not limited thereto. For example, other auxiliary devices may be included or the present auxiliary devices may be excluded.

The MTCU 7 determines a torque state based on information from an accelerator, a brake, and a vehicle speed, and controls an output of the motor generator 9 corresponding to the torque state. That is, the MTCU 7 controls a switching operation of the inverter 8 so as to control the output of the motor generator 9 to correspond to the torque information. In addition, the MTCU 7 receives the SOC of the battery 2 from the MCU 20 through the communication unit 60 of the BMS 1, and controls the SOC level of the battery 2 toward a target value (e.g., 55%). For example, when the SOC level transmitted from the MCU 20 is lower than 55%, the MTCU 7 controls a switch to control the inverter 8 so as to output power toward the battery 2 and charge the battery 2. In such case, current flows toward the battery 2 so as to charge the battery 2. When the SOC level is greater than 55%, the MTCU 7 controls the switch to control the inverter 8 to output the power toward the motor generator 9 and discharge the battery. In such case, current flows from the battery 2 to power the vehicle.

The inverter 8 controls whether the battery is to be charged or discharged in response to the control signal from the MTCU 7. The motor generator 9 uses the electrical energy of the battery 2 to drive the vehicle based on the torque information transmitted from the MTCU 7.

Figure 2:
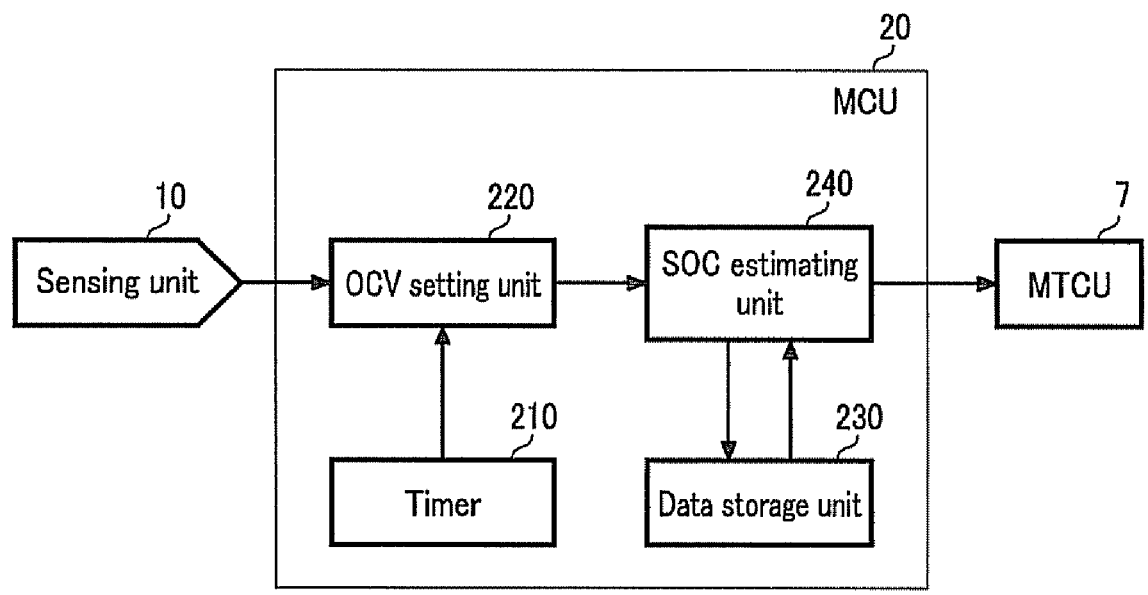
FIG. 2 shows a schematic diagram of an MCU of the BMS according to aspects of the present invention.
Figure 3:
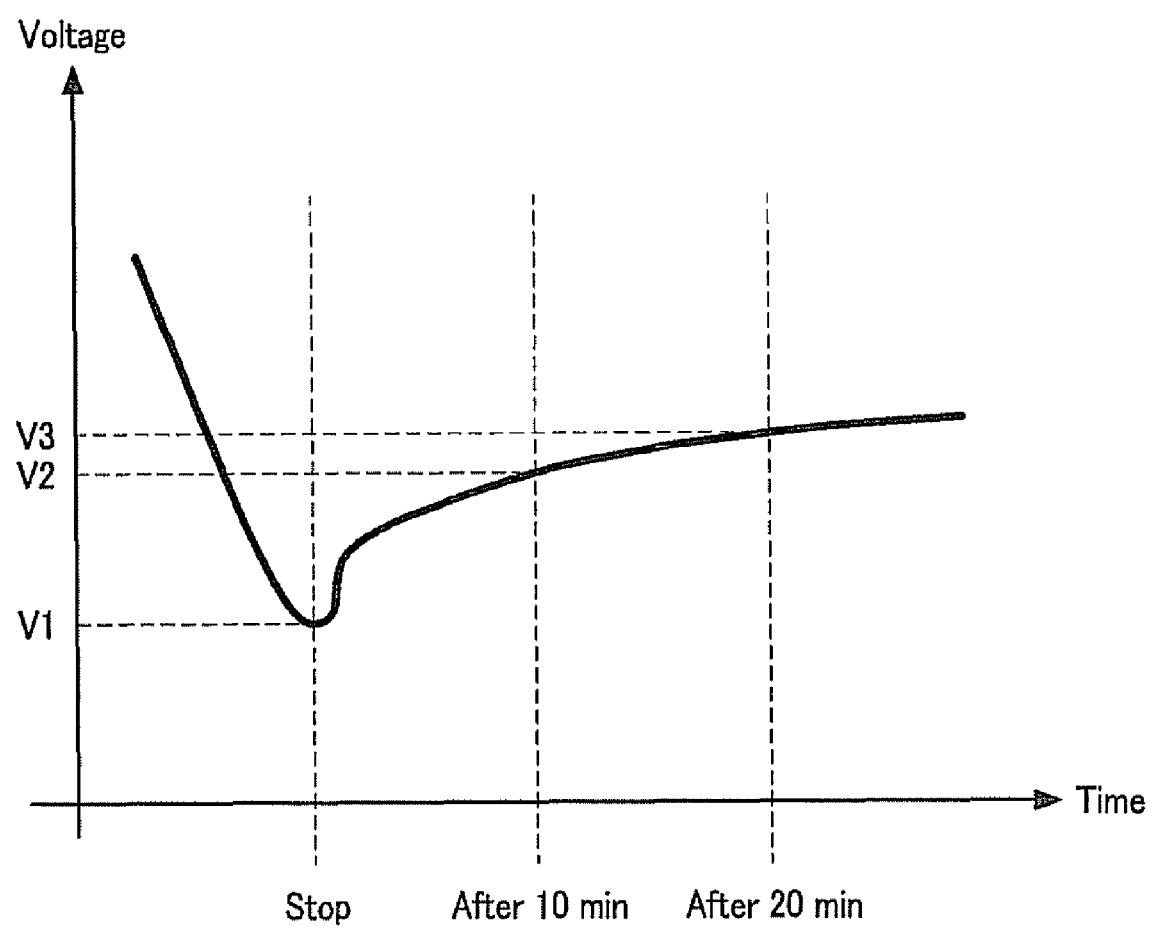
FIG. 3 shows a diagram of a relationship between time and battery voltage.

FIG. 2 schematically shows the MCU 20 of the BMS according to aspects of the present invention, and FIG. 3 schematically shows a relationship between time and battery voltage. As shown in FIG. 2, the MCU 20 includes a timer 210, an OCV setting unit 220, a data storage unit 230, and an SOC estimating unit 240.

The timer 210 measures the length of a no-load state period from a first or stop point, and transmits the measured value to the OCV setting unit 220. The first point indicates a time that the vehicle is stopped or a time that charging or discharging is stopped. When the charging or discharging is stopped, the battery current equals 0. The determining period can be experimentally determined.

The OCV setting unit 220 compares the length of time of the no-load state period from the first point with the determining period, and determines an OCV setting time according to the comparison result. In more detail, when the no-load state period equals the determining period, the battery voltage at this time point is set to an OCV setting. However, the OCV setting unit 220 is not limited thereto. The OCV setting unit 220 may set an OCV setting according to the lengths of time of the no-load state period and the determining period.

The determining period according to aspects of the present invention varies with an experimentally predetermined time increment. As shown in FIG. 3, the determining period increases by increments of 10 minutes (e.g., 10 min, 20 min, and 30 min). Thus, at 10 minutes, 20 minutes, and 30 minutes from the first or stop point, the OCV setting of the battery 2 is measured and the SOC of the battery 2 is estimated therefrom. A relationship between a time that increases with the increment of 10 minutes and the corresponding battery voltage can be observed. In this case, battery voltages V1, V2, and V3 on the voltage axis of the graph respectively correspond to a battery voltage measured when the vehicle is stopped V1, a battery voltage measured after 10 minutes have passed V2, and a battery voltage measured after 20 minutes have passed V3, and the MCU 20 may set the respective battery voltages as OCV settings. In more detail, the OCV setting unit 220 sets a determining period to 10 minutes, compares the length of the no-load state period with the length of the determining period, i.e., the OCV setting unit 220 compares the length of time that there has been no load on the battery 2 to 10 minutes. When the length of the no-load state period is less than the determining period, the OCV setting unit 220 maintains the OCV setting at the voltage V1 corresponding to the stop point. When the length of the no-load state period corresponds to 10 minutes, the battery voltage V2 is measured and set as the new OCV setting. The determining period at this time point is set to 20 minutes from the first or the stop point. So, the OCV setting unit 220 now compares the length of the time since there has been no load on the battery 2 with 20 minutes. If the length of time of the no-load state period is less than 20 minutes, the OCV setting unit 220 maintains the OCV setting at the previous state as determined after 10 minutes. If the length of time of the no-load state period equals the determining period (20 minutes), the OCV setting unit 220 sets a new OCV setting as the voltage V3 determined at 20 minutes after the load was removed from the battery 2. As described, the OCV setting unit 220 sets a battery voltage corresponding to the voltage at the end of each determining period as the OCV setting. The determining period increases with a predetermined time increment (i.e., 10 minutes) from the first or stop point. Therefore, the OCV setting unit 220 can acquire a more precise OCV setting by resetting the OCV setting as the stop period of the vehicle becomes longer. Further, the OCV setting unit 220 is not limited thereto. The predetermined time increment may be shorter or longer. As the predetermined time increment decreases, the OCV setting unit 220 produces more information regarding the state of the battery. As the predetermined time increment increases, fewer measurements are taken and the error associated with the OCV setting determinations increases. Also, as the predetermined time increment increases, a load is more likely to be placed on the battery 2 before the OCV setting has been updated.

The data storage unit 230 stores battery state information. In more detail, the data storage unit 230 stores an OCV to SOC data table, and stores an estimated SOC transmitted from the SOC estimating unit 240.

The SOC estimating unit 240 receives the OCV setting from the OCV setting unit 220 and estimates the corresponding SOC therefrom. The SOC estimating unit 240 uses the OCV to SOC table to estimate the SOC. When the length of the no-load state period is less than the length of the determining period, the SOC estimating unit 240 maintains a previous SOC. In addition, when the vehicle starts moving or charging/discharging occurs, and the battery current flows again, the SOC is estimated by using a current integration method. The current integration method estimates the battery current by integrating the amount of current generated by the battery 2 with respect to time.

The SOC estimating unit 240 receives a more accurate OCV setting from the OCV setting unit 220 as the length of the stop period increases, and therefore a more accurate OCV is converted to a more precise SOC.

When charging or discharging of the battery is stopped, the battery management system according to aspects of the present invention can set a precise OCV by using the above-described process.

Figure 4:
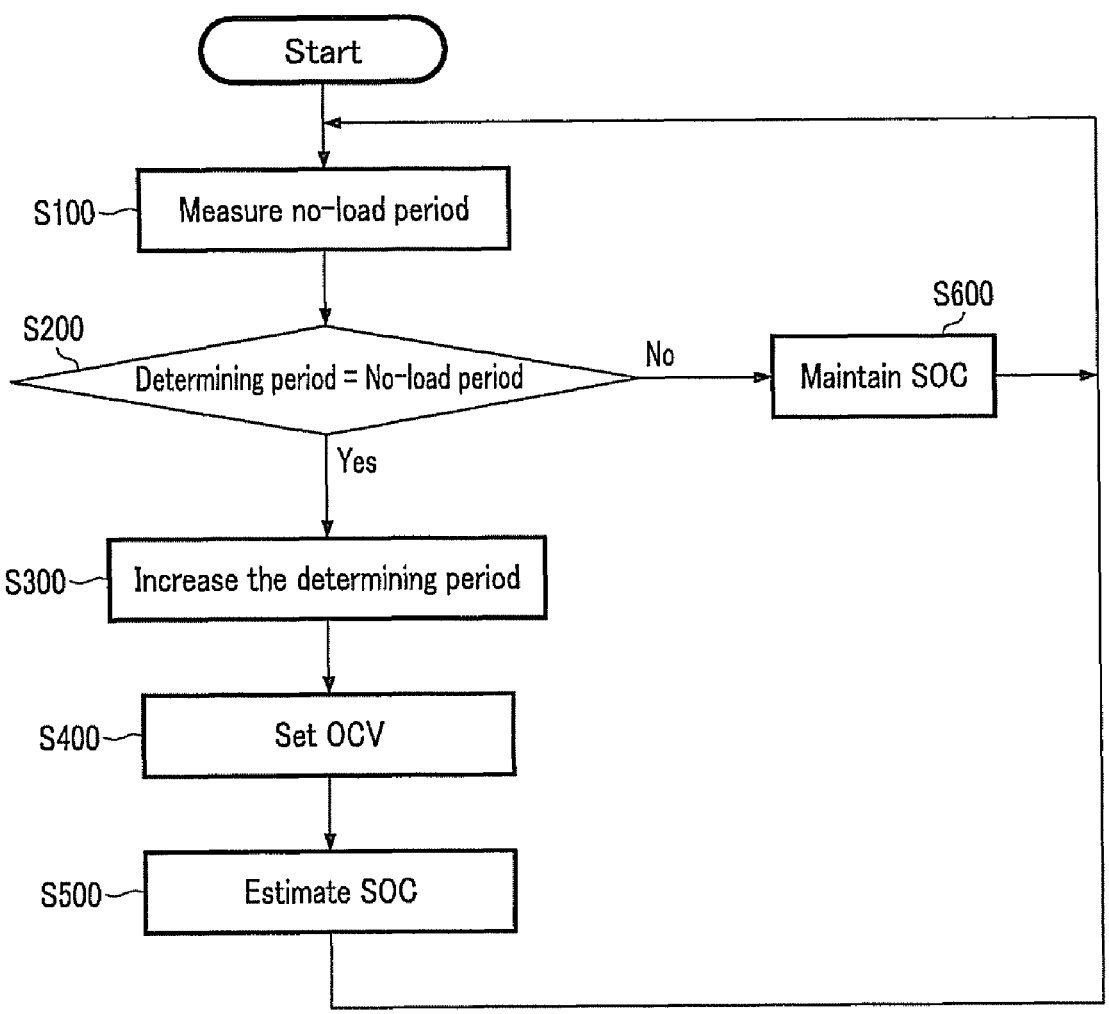
FIG. 4 shows a flowchart of a driving method of the BMS according to aspects of the present invention.

FIG. 4 is a flowchart of a driving process of the battery management system according to aspects of the present invention. The MCU 20 of the BMS 1 measures the length of time of the no-load period from the first or stop point, in operation S100. At this time, the first or stop point corresponds to a time at which the vehicle is stopped or charging or discharging is stopped.

The length of the no-load state period measured in operation S100 is compared to the length of the determining period in operation S200. In more detail, when the length of the no-load state period corresponds or equals the length of the determining period as determined in operation S200, the determining period is increased by a predetermined time increment in operation S300. The determining period may be increased by a constant predetermined time increment or a varying predetermined time increment.

As discussed above with regard to FIG. 3, the determining period increases by an increment of 10 minutes (i.e., 10 min, 20 min, and 30 min) meaning that the determining period will be reset to be equal to 20 minutes after the stop point. When the length of the no-load period equals the reset determining period of 20 minutes, the BMS 1 will then repeat operations S300, S400, and S500. A relationship between the time that increases by 10 minutes from the time at which the vehicle is stopped and a corresponding battery voltage can be observed. In addition, the MCU 20 can set a battery voltage at each time point or reset determining period to an OCV setting. A battery voltage measured at the end of the determining period is set as the OCV setting in operation S400. The OCV setting as set in operation S400 is received and an SOC corresponding to the received OCV is estimated by using the OCV to SOC data table in operation S500.

The length of the no-load state period and the length of the determining period are compared in operation S200, and a previous SOC is maintained when the length of the no-load state period is shorter than the length of the determining period in operation S600. That is, the previous SOC is maintained when the length of the no-load state period is shorter than the length of the determining period and an SOC estimated at the time that the vehicle is stopped is maintained. And, when the length of the no-load state period is longer than 10 minutes and shorter than 20 minutes, an SOC corresponding to the OCV setting measured at 10 minutes from the stop or first point is maintained.

As described, the battery management system using the SOC estimation method by setting an OCV setting, and the driving method thereof, compare the length of the no-load state period with respect to the first or stop point with the determining period with respect to the first or stop point and set an OCV setting according to the length of the no-load state period and the determining period (or reset determining period) or when the two lengths are equal. In this case, a battery voltage corresponding to the determining period that increases with a predetermined time increment from the first point is set to an OCV setting. Then, an SOC corresponding to the OCV setting is estimated.

According to aspects of the present invention, a more precise OCV can be estimated as the length of the no-load period of the vehicle is increased. Accordingly, a battery management system having an advantage of measuring a more precise SOC, and a driving method thereof, can be provided.

In addition, the battery management system and the driving method can prevent over-charging/over-discharging of the battery by preventing an SOC estimation error that can occur due to an OCV estimation error.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A battery management system for a vehicle, comprising:
   a main control unit (MCU) configured to set an open circuit voltage (OCV) setting and estimate a state of charge (SOC) therefrom for a plurality of times; and
   a sensing unit configured to measure a battery current of a battery and a battery voltage of the battery, the battery current and the battery voltage being measured at an expiration of a determining period, and to transmit at least the battery voltage to the MCU,
   wherein the MCU is further configured to, for each of the plurality of times:
      set the battery voltage measured at the expiration of the determining period as the OCV setting and estimate the SOC therefrom in response to a length of time of a no-load state period equaling a length of time of the determining period, and the lengths of time of the no-load state period and the determining period are measured with respect to a stop point; and
      extend the determining period by an increment of time upon the setting of the OCV setting, and
   wherein the no-load state period is a period in which the battery is not being charged and not being discharged.

2. The battery management system of claim 1, wherein the increment of time varies.

3. The battery management system of claim 2, wherein the MCU comprises:
   a timer configured to measure the length of the no-load state period from the stop point;
   an OCV setting unit configured to set the battery voltage as the OCV setting in response to the length of the no-load state period and the length of the determining period being equal;
   an SOC estimating unit configured to receive the OCV setting and estimate the SOC from the received OCV setting; and
   a data storage unit configured to store the estimated SOC.

4. The battery management system of claim 3, wherein the data storage unit further comprises an OCV to SOC data table from which the estimated SOC is determined.

5. The battery management system of claim 3, wherein the SOC estimating unit is further configured to estimate the SOC in response to the length of time of the no-load state period and the length of time of the determining period being equal.

6. The battery management system of claim 1, wherein the length of time of the determining period is configured to be a number of increments of the increment of time.

7. The battery management system of claim 6, wherein the increment of time is 10 minutes.

8. The battery management system of claim 1, wherein the stop point corresponds to a time at which the vehicle is stopped or charging and discharging of the battery is stopped.

9. A driving method of a battery management system for a vehicle, the driving method comprising:
   (a) measuring a length of time of a no-load state period with respect to a stop point;
   (b) during the no-load state period, setting a measured battery voltage of a battery as an open circuit voltage (OCV) setting in response to the length of time of the no-load state period equaling a length of time of a determining period with respect to the stop point;
   (c) estimating a state of charge (SOC) from the OCV setting;
   (d) extending the determining period by an increment of time upon the setting of the OCV setting; and
   (e) repeating steps (a) through (d),
   wherein the no-load state period is a period in which the battery is not being charged and not being discharged.

10. The driving method of claim 9, wherein the stop point corresponds to a time at which the vehicle is stopped or charging and discharging of the battery is stopped.

11. The driving method of claim 9, wherein the increment of time varies.

12. The driving method of claim 9, wherein when the length of time of the no-load state period is less than the length of time of the determining period, the SOC remains unchanged.

13. The driving method of claim 9, wherein the estimating comprises relating the OCV setting to the SOC via an OCV to SOC data table.

14. A battery management system for a vehicle, comprising:
   a main control unit (MCU) configured to set an open circuit voltage (OCV) setting; and
   a sensing unit configured to measure a battery current of a battery and a battery voltage of the battery, and to transmit at least the battery voltage to the MCU,
   wherein the MCU is further configured to set the measured battery voltage as the OCV setting and to estimate a state of charge (SOC) therefrom upon expiration of each of a plurality of increments of time during a no-load state period, a first of the increments of time being measured with respect to a stop point, a second of the increments of time being measured with respect to the expiration of the first of the increments of time, and a third of the increments of time being measured with respect to the expiration of the second of the increments of time, and wherein the no-load state period is a period in which the battery is not being charged and not being discharged.

15. The battery management system of claim 14, wherein, during the no-load state period, the vehicle is stopped or charging and discharging of a battery is stopped.

16. The battery management system of claim 14, wherein the increments of time are increments of 10 minutes.

17. The battery management system of claim 14, wherein the increments of time are random.

\* \* \* \* \*